(12) United States Patent
Pratt

(10) Patent No.: US 8,348,566 B2
(45) Date of Patent: Jan. 8, 2013

(54) BLIND FASTENER

(75) Inventor: John D. Pratt, Laguna Niguel, CA (US)

(73) Assignee: Monogram Aerospace Fasteners, Inc., Los Angeles, CA (US)

( * ) Notice: Subject to any disclaimer, the term of this patent is extended or adjusted under 35 U.S.C. 154(b) by 111 days.

(21) Appl. No.: 12/760,682

(22) Filed: Apr. 15, 2010

(65) Prior Publication Data

US 2011/0123289 A1 May 26, 2011

Related U.S. Application Data

(63) Continuation of application No. PCT/US2008/080114, filed on Oct. 16, 2008.

(60) Provisional application No. 60/999,889, filed on Oct. 22, 2007.

(51) Int. Cl.
*F16B 13/04* (2006.01)

(52) U.S. Cl. ............................................. 411/38; 411/42

(58) Field of Classification Search .................... 411/38, 411/42, 34, 353, 44, 46, 51, 55, 75
See application file for complete search history.

(56) References Cited

U.S. PATENT DOCUMENTS

| | | | | |
|---|---|---|---|---|
| 3,267,793 A | * | 8/1966 | Devine et al. | 411/51 |
| 3,369,289 A | * | 2/1968 | Gapp | 29/512 |
| 4,457,652 A | | 7/1984 | Pratt | |
| 4,607,992 A | * | 8/1986 | Mauritz et al. | 411/45 |
| 4,844,673 A | | 7/1989 | Kendall | |
| 5,152,648 A | | 10/1992 | Pratt | |
| 5,498,110 A | | 3/1996 | Stencel et al. | |
| 6,547,500 B2 | | 4/2003 | Cosenza et al. | |
| 6,846,141 B2 | | 1/2005 | Heinzelmann et al. | |
| 2004/0022596 A1 | | 2/2004 | Belanger | |
| 2006/0062650 A1 | * | 3/2006 | Keener | 411/34 |

OTHER PUBLICATIONS

International Search Report and Written Opinion issued May 22, 2009 related to PCT/US2008/080114.

* cited by examiner

*Primary Examiner* — Gary Estremsky
(74) *Attorney, Agent, or Firm* — Woodard, Emhardt, Moriarty, McNett & Henry LLP

(57) ABSTRACT

Disclosed is a blind fastener that includes a body, a bolt and a sleeve that has an internal recess that contains an insert. The body includes a tapered ramp that the sleeve is enlarged over. Compression of the sleeve against the work piece causes the sleeve to fold at the internal recess to form an enlarged blind side head that bears against the work piece.

21 Claims, 6 Drawing Sheets

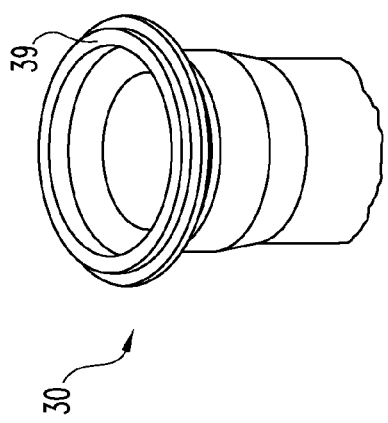
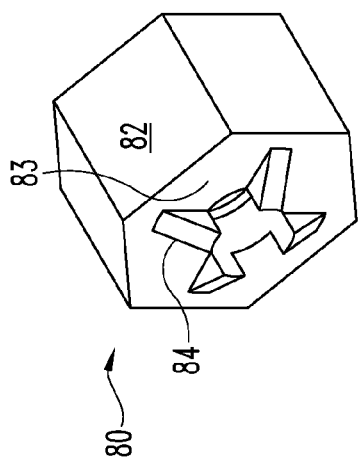
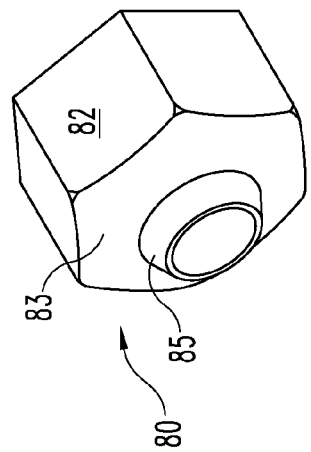
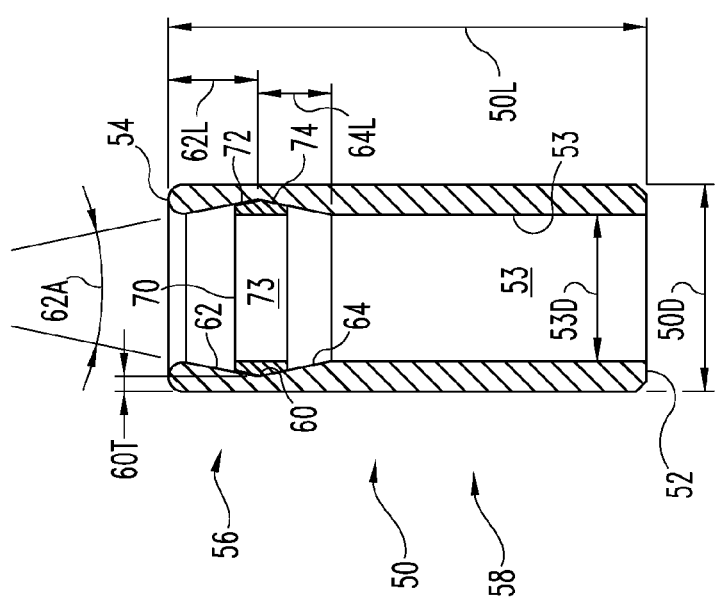
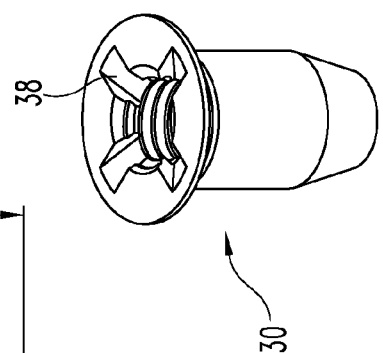

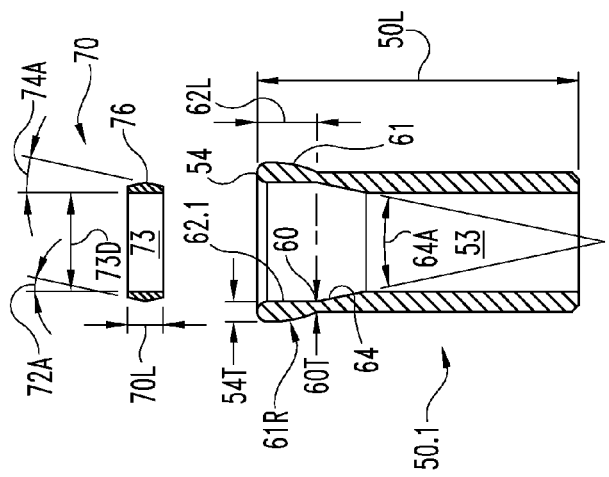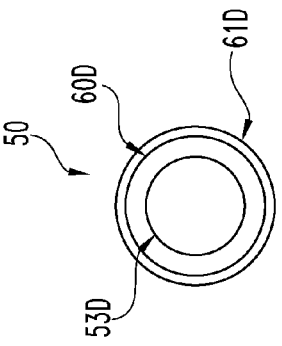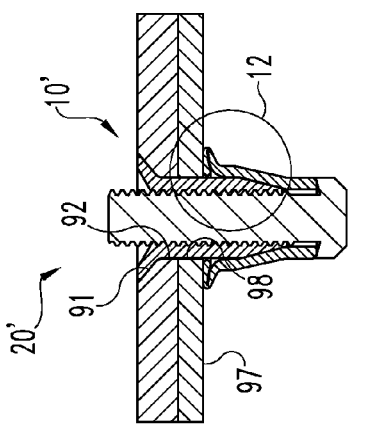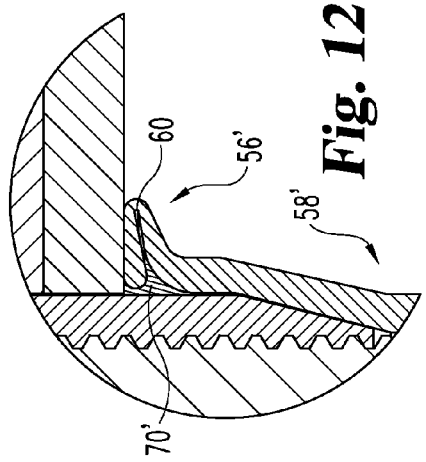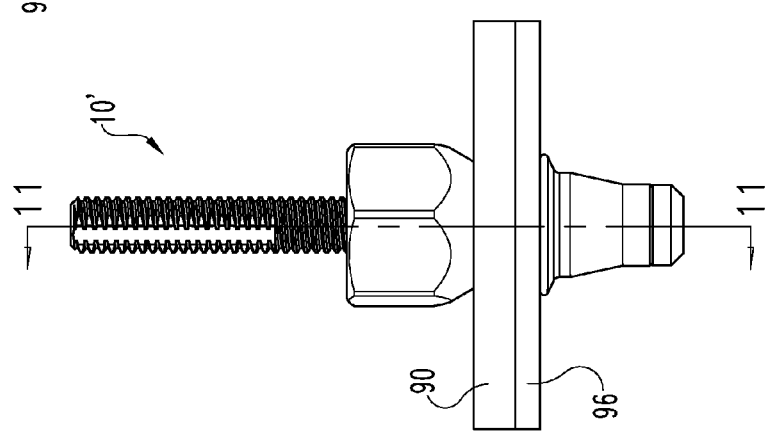

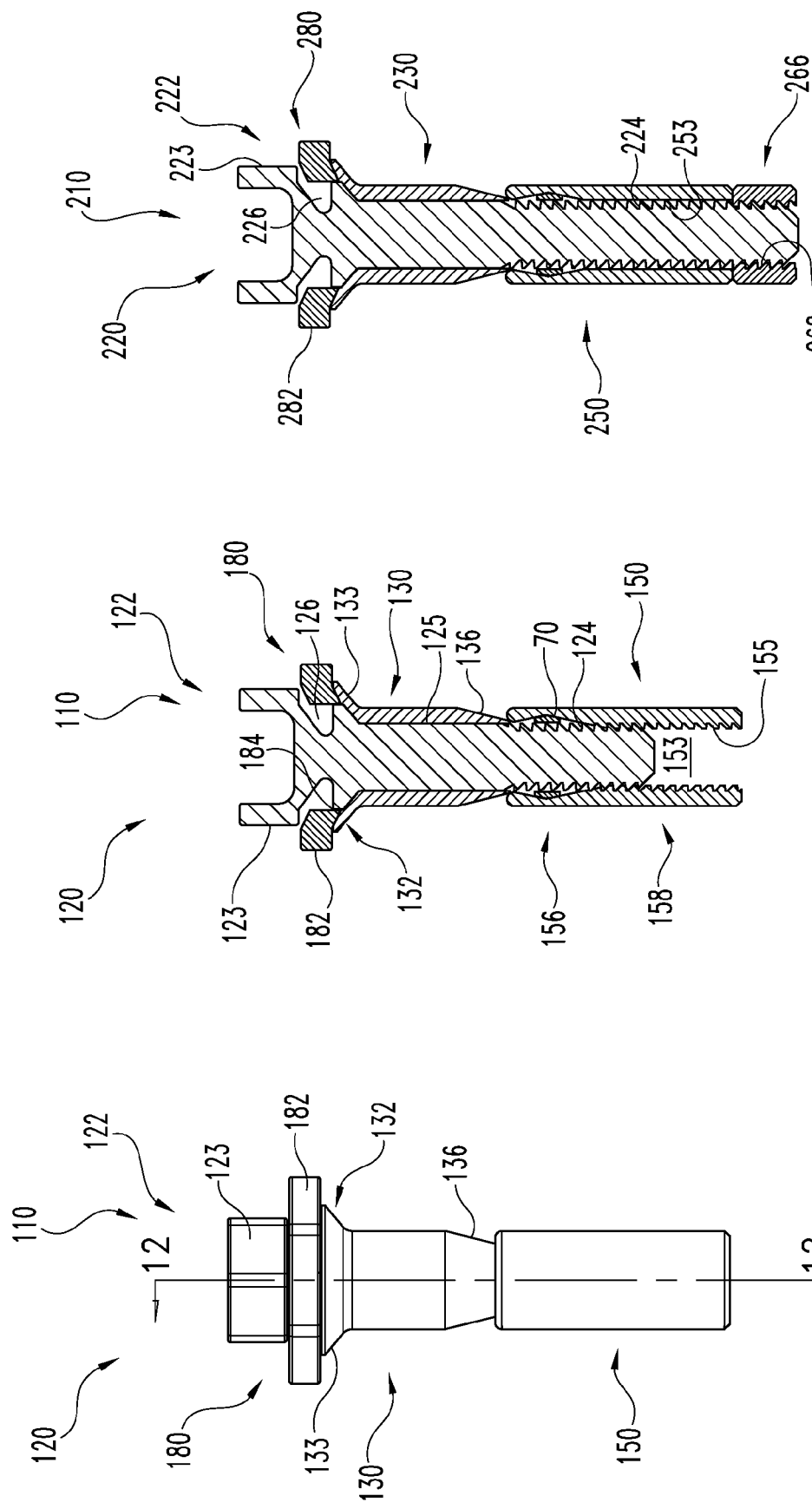

BLIND FASTENER

This application is a continuation of International Application No. PCT/US2008/080114, filed Oct. 16, 2008, which claims the benefit of U.S. Provisional Application No. 60/999,889, filed Oct. 22, 2007, both of which are hereby incorporated by reference.

FIELD OF THE INVENTION

The present invention relates to a blind fastener.

BACKGROUND OF THE INVENTION

Blind fasteners can be used to connect two or more components together when access is limited to one side of the components. Blind fasteners are also used with robotic assembly equipment to eliminate the need to coordinate activity on both sides of a fastener. By way of example, blind fasteners are used to attach panels to other components to make wings, flaps, ailerons and other airframe structures. Fasteners used on aerodynamically critical surfaces generally have flush heads that seat into machined or dimpled countersinks in the outer panel. Fasteners used in interior assemblies may have generally protruding heads.

Specifically regarding aircraft construction, modern aircraft are generally constructed of aluminum and laminated composite panels and structural shapes. Laminated composites, while possessing superior stiffness and strength, are prone to crushing damage unless forces are spread over enough area to minimize localized compressive stresses. In this regard, it is also important for localized compressive forces to be spread substantially uniformly over the affected area to minimize local compressive damage. Thus, in applications involving laminated composites, the size and configuration of the blind side head are important performance parameters. Fasteners with inadequate blind side heads may require thicker (and heavier) composite panels than an equivalently sized fastener with an adequately sized and configured blind side head.

BRIEF DESCRIPTION OF THE DRAWINGS

FIG. 4 is a side cross-sectional view of sleeve 50 of FIG. 1.

FIG. 5 is a top perspective view of body 30 of FIG. 1.

FIG. 6 is a bottom perspective view of drive nut 30 of FIG. 1.

FIG. 7 is a bottom perspective view of an alternative embodiment of drive nut 80 of FIG. 1.

FIG. 8 is a top perspective view of an alternative embodiment of body 30 of FIG. 1.

FIG. 10 is a side elevational view of blind fastener 10 installed through work pieces but prior to separation of the wrenching components.

FIG. 11 is a cross-sectional view of the FIG. 10 installed blind fastener as viewed along line 11-11 without the wrenching components.

FIG. 12 is an enlarged view of the encircled partial view of FIG. 11.

FIG. 13 is a side cross-sectional view of sleeve 50 in an intermediate manufacturing configuration.

FIG. 14 is an end view of sleeve 50 of FIG. 13.

FIG. 15 is a side elevational view of blind fastener 110.

FIG. 16 is a cross-sectional view of the FIG. 15 blind fastener as viewed along line 12-12.

FIG. 18 is a side cross-sectional view of blind fastener 210.

DETAILED DESCRIPTION OF THE DRAWINGS

Figure 3:
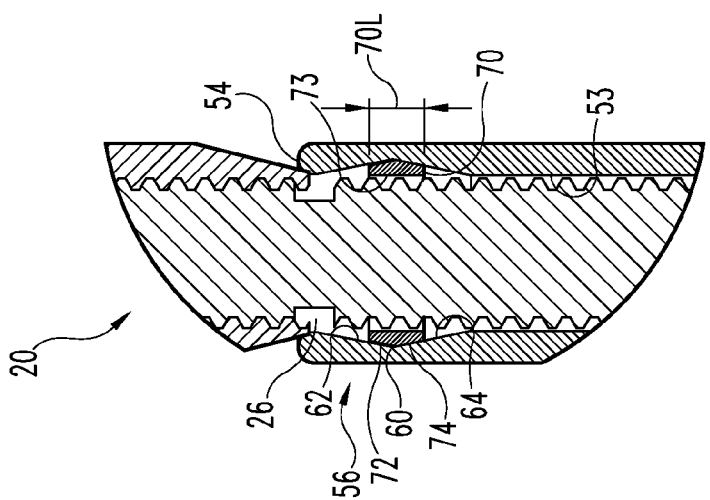
FIG. 3 is an enlarged view of the encircled partial view of FIG. 2.

For the purpose of promoting an understanding of the disclosure, reference will now be made to certain embodiments thereof and specific language will be used to describe the same. It will nevertheless be understood that no limitation of the scope of this disclosure is thereby intended, such alterations, further modifications and further applications of the principles described herein being contemplated as would normally occur to one skilled in the art to which the disclosure relates. In several FIGs., where there are the same or similar elements, those elements are designated with the same or similar reference numerals.

Figure 2:
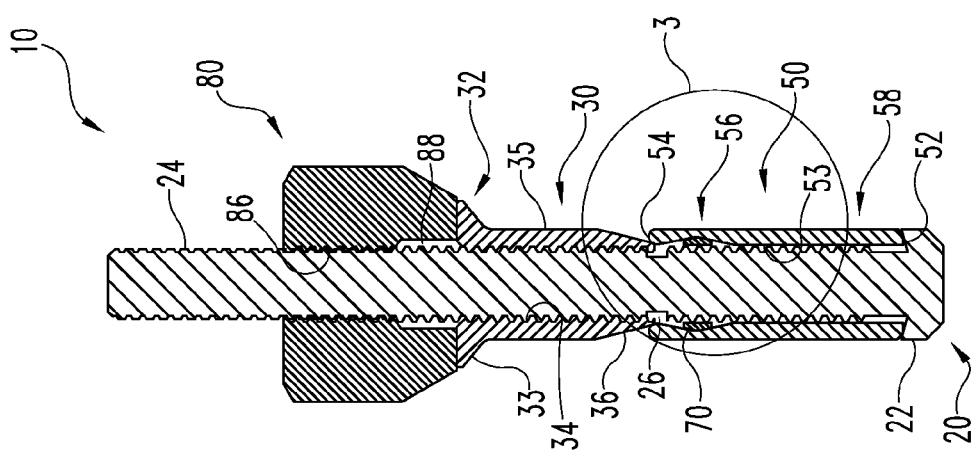
FIG. 2 is a cross-sectional view of the FIG. 1 blind fastener as viewed along line 2-2.
Figure 1:
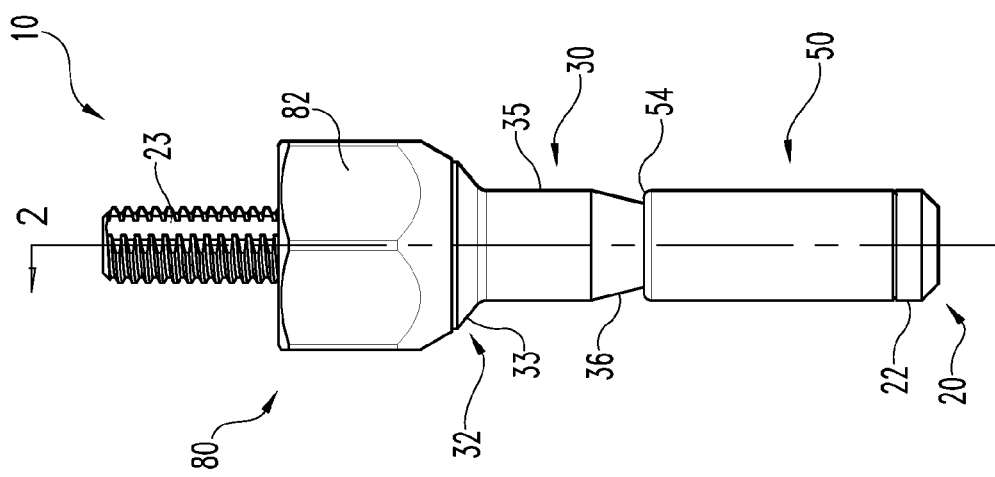
FIG. 1 is a side elevational view of a blind fastener.

Referring now to the drawings and in particular to FIGS. 1-3, a blind fastener 10 is illustrated generally comprising core bolt 20, body 30, sleeve 50, insert 70 and drive nut 80. Core bolt 20 generally comprises head 22, wrenching portion 23, male threaded portion 24 and break groove 26. Body 30 generally comprises head portion 32, bearing portion 33, female threaded portion 34, outer surface 35 and tapered ramp 36. Sleeve 50 generally comprises bottom edge 52, bore 53, leading edge 54, bulbing portion 56 and base portion 58. Sleeve 50 includes insert 70 positioned approximately within narrowed portion 60. Sleeve 50 also includes narrowed portion 60 defined by leading taper 62 and trailing taper 64 in bore 53. Insert 70 includes leading taper 72 and trailing taper 74 and bore 73. Insert 70 has a length of 70L, length 70L generally exceeds twice the pitch length of the threads of the threads on male threaded portion 24 of bolt 20. Drive nut 80 includes wrenching surfaces 82, female threaded portion 86 and open bore 88.

Blind fastener 10 is assembled with core bolt 20 passing through bore 53 with male threaded portion 24 threadingly engaged with female threaded portion 34 and female threaded portion 86. Leading edge 54 abuts tapered ramp 36.

Drive nut 80 and body 30 are rotationally constrained together (embodiments of which are illustrated below). In this regard, wrenching surfaces 23 can be engaged with a tool to rotate bolt 20 in a tightening direction relative to body 30 and drive nut 80. Wrenching surfaces 82 can be engaged with a tool to restrict rotation of drive nut 80 and body 30 during installation of blind fastener 10 while core bolt 20 is being threaded through body 30 and drive nut 80.

Blind fastener 10 can accordingly be installed by restraining drive nut 80 which restrains body 30 and then tightening core bolt 20 into drive nut 80 to advance head 22 towards body 30 which presses leading edge 54 over tapered ramp 36. Continued tightening of core bolt 20 out of drive nut 80 pushes sleeve 50 into contact with the blind side of the panel that fastener 10 is inserted through. Upon contact with the blind side panel, sleeve 50 and more particularly, bulbing portion 56, buckle or bulb at narrowed portion 60 to form an enlarged head. When the blind head is sufficiently formed and clamped against the blind side panel, the torsional resistance in bolt 20 increases until the torsional strength of break groove 26 is exceeded which terminates the installation.

Referring now to FIG. 4, a side cross-sectional view of sleeve 50 is illustrated. Sleeve 50 has an outer diameter of 50D and a bore diameter of 53D. Buckling portion 56 is defined by leading taper 62 between leading edge 54 and narrowed portion 60 and then trailing taper 64 between narrowed portion 60 and bore 53. Leading taper 62 has a length 62L while trailing taper 64 has a length 64L with sleeve 50 having an overall length of 50L. Leading taper 62 is a conical taper at angle 62A. In one embodiment, this is only an approximation because leading taper 62 is actually parabolic in shape but can be approximated by a conical taper. Other embodiments may use an actual conical taper as illustrated.

Insert 70 is positioned between leading taper 62 and trailing taper 64. Insert 70 includes leading taper 72 and trailing taper 74 with bore 73. The angle of leading taper 72 is generally equal to the angle of leading taper 62. Similarly, the angle of trailing taper 74 is generally equal to the angle of trailing taper 64. Leading edge 54 has a rounded cross-section as illustrated. The embodiment illustrated in FIG. 4 bore 53 is substantially smooth. In other embodiments described herein, bore 53 may include female threads to match bolt 20.

Sleeve 50 may be made of a malleable material that has the ability to bulb or expand a predetermined amount with fracturing. For example, polished and annealed AISI 304 stainless steel is able to undergo a strain of approximately 100% without fracture. Commercially pure titanium, other 300-series stainless steels and A-286 corrosion and heat resistance steel (CRES) may also be used. In any event, sleeve 50 is not deemed as limited to any specific material as one of ordinary skill in the art may appreciate other materials may be appropriate for deformable sleeve 40.

Referring now to FIG. 5, the top perspective view of body 30 is illustrated showing wrenching cavity 38. Referring now to FIG. 6, a bottom perspective view of drive nut 80 is illustrated showing protrusions 84. In one embodiment, protrusions 84 are matched with wrenching cavities 38 so that drive nut 80 and body 30 are rotationally constrained together when assembled as illustrated in FIG. 2. In the embodiment illustrated in FIGS. 5 and 6, protrusions 84 and wrenching cavities 38 are in a cruciform configuration with shallow recesses to fit in the countersunk configuration of head portion 32. However, other embodiments may utilize other configurations for wrenching cavity 38 and protrusions 84 as appropriate.

Referring now to FIGS. 7 and 8, alternative embodiments of drive nut 80 and body 30 are illustrated. In particular, FIG. 7 illustrates drive nut 80 comprising underside 83 and deformable protrusion 85. Deformable protrusion 85 is configured such that when drive nut 80 is tightened into a body 30 such as the body 30 illustrated in FIG. 5, deformable portion 85 deforms to configure to wrenching cavities 83 to rotationally constrain drive nut 80 with body 30. Similarly, FIG. 8 illustrates body 30 comprising deformable protrusion 39 that can deform to mate with protrusions 84 such as those on drive nut 80 illustrated in FIG. 6 to rotationally constrain body 30 and drive nut 80 together. Yet other embodiments of body 30 and drive nut 80 can use other means to resist relative rotation including, but not limited to disc friction at the mating surface or mechanical interface such as knurls on either or both surfaces.

Figure 9E:
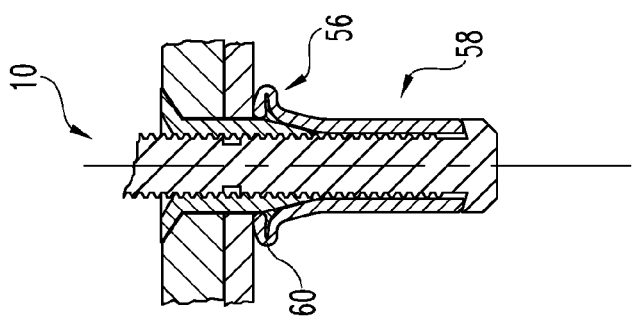
FIG. 9e is a cross-sectional view of blind fastener 10 partially installed through work pieces.
Figure 9D:
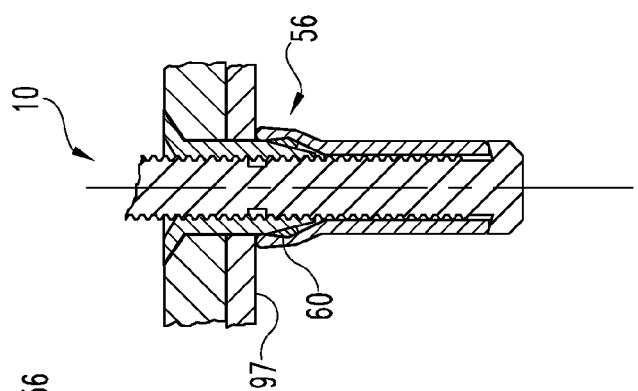
FIG. 9d is a cross-sectional view of blind fastener 10 partially installed through work pieces.
Figure 9C:
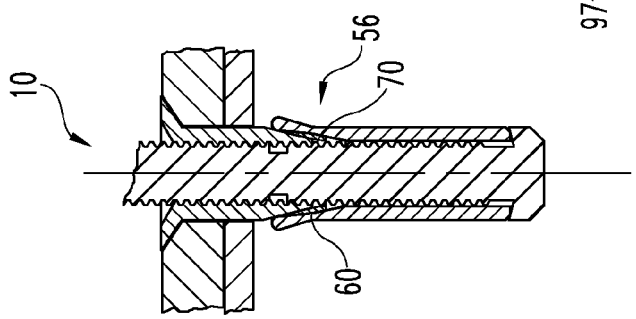
FIG. 9c is a cross-sectional view of blind fastener 10 partially installed through work pieces.
Figure 9B:
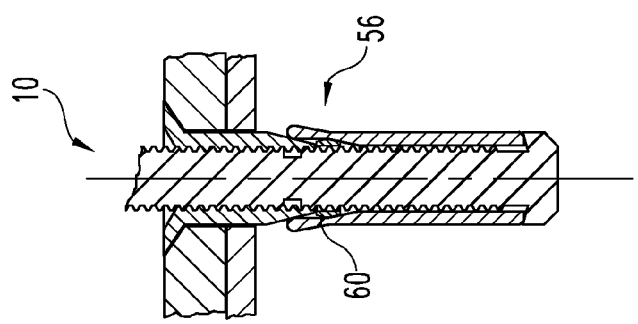
FIG. 9b is a cross-sectional view of blind fastener 10 partially installed through work pieces.
Figure 9A:
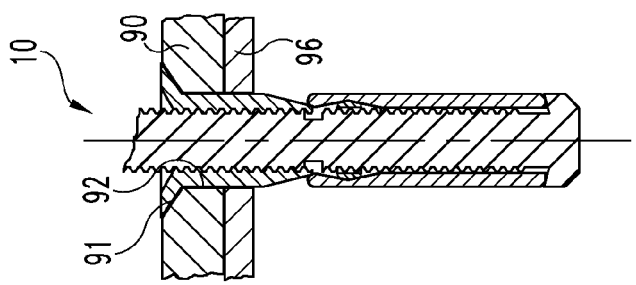
FIG. 9a is a cross-sectional view of blind fastener 10 partially installed through work pieces.

Referring now to FIGS. 9a to 9e, blind fastener 10 is illustrated in sequential partially installed conditions through work pieces 90 and 96. FIG. 9a illustrates the initial installation with blind fastener 10 being placed through work pieces 90 and 96 with head portion resting in countersunk recess 91 and sleeve 50 protruding on the blind side of work pieces 96.

Referring now to FIG. 9b, bolt 20 has advanced onto body 30 with leading edge 54 positioned approximately half-way up ramp 36 with bulbing portion 56 beginning to deform with leading edge 54 expanding around tapered ramp 36.

Referring now to FIG. 9c, clamp 10 is illustrated in a further insulation position with leading edge 54 near the top of tapered ramp 36 and insert 70 on the bottom of tapered ramp 36.

Referring now to FIG. 9d, clamp 10 is illustrated in an intermediate installed position with leading edge 54 contacting bottom side 97 and sleeve 50 beginning to buckle at narrowed portion 60.

Referring now to FIG. 9e, clamp 10 is illustrated in an intermediate installed position with bulbing portion 56 substantially bulbed such that narrowed portion 60 has buckled to form the outside of bulbed portion 56 and leading edge 54 bears against both outer surface 35 and bottom side 97.

Referring now to FIGS. 10, 11 and 12, blind fastener 10 is illustrated installed through work pieces 90 and 96. (FIG. 10 illustrates blind fastener 10 installed through work pieces prior to separation of wrenching components including drive nut 80 and the frangible portion of bolt 20). In particular, sleeve 50 is deformed such that a bulbing portion 56' is an enlarge blind side head and base portion 58' substantially covers body 30. The enlarged blind side head sits flat against bottom side 97 with bulbing portion 56' folded such that leading taper 62 contacts trailing taper 64. As illustrated in FIG. 12, insert 70' conforms to the interior space creating bulbing portion 56'.

The installation of blind fastener 10 can be terminated by controlling the torque applied to bolt 20. In the illustrated embodiment, installation torque can be controlled by break groove 26 that separates automatically upon application of a predetermined torque load. As illustrated in FIG. 11, break groove 26 has fractured leaving stub bolt 20'. Such fracture is designed to occur upon completion of the installation of blind fastener 10, for example when the torque required to over-deform sleeve 50 exceeds the torsional strength of break groove 26.

The illustrated embodiments of blind fastener 10 include a countersunk head portion 32 on body 30. In other embodiments, head portion 32 can be a protruding type that will sit on the surface of the access side work piece.

The illustrated embodiments of blind fastener 10 also include drive nut 80 which is optional. Body 30 can be restrained from rotating by direct engagement with wrenching cavities 38 by an appropriate tool.

Referring now to FIGS. 13 and 14, sleeve 50.1 depicts an intermediary manufacturing configuration of sleeve 50. Sleeve 50.1 comprises a generally cylindrical tube with bore 53 that transitions to enlarged bore 62.1 through trailing taper 64 at angle 64A. Protrusion 61 outside of enlarged bore 62.1 bulbs beyond the rest of sleeve 50 with a radiused profile as illustrated. The radius of the radiused profile of protrusion 61 is 61R. The maximum diameter of sleeve 50.1 is 61D, which is the largest diameter of protrusion 61. Enlarged bore 62.1 has a diameter of 60D, which may be substantially equal to the diameter of narrowed portion 60 of sleeve 50.

Insert 70 comprises a generally cylindrical insert manufactured of deformable material, for example plastic. Insert 70 has a bore 73 with diameter 73D that is substantially equal to diameter 53D. The outside of insert 70 is defined by leading taper 72 angled at angle 72A and trailing taper 74 angled at angle 74A. Leading taper 72 and trailing taper 74 meet at point 76. The outer diameter of point 76 is approximately equal to diameter 60D.

Insert 70 is inserted through enlarged bore 62.1 to narrowed portion 60 with point 76 generally being aligned with narrowed portion 60. The manufacture of sleeve 50.1 may then be completed by crimping, swaging or roll forming protrusion 61. In one embodiment the diameter of protrusion 61 is reduced to be substantially equal to diameter 50D. By way of example only, U.S. Pat. No. 5,152,648 issued to John D. Pratt on Oct. 6, 1992 discloses one method of cold forming a protrusion on a sleeve by pressing the sleeve through a forming die. Another method of forming is to crimp the leading edge in a collet such as a C5 collet commonly used to hold stock on metal working lays. After forming, sleeve 50 then can be assembled with core bolt 20 and body 30 as described above.

Referring now to FIGS. 15 and 16, blind fastener 110 is illustrated. Blind fastener 110 is an alternative embodiment of blind fastener 10. Blind fastener 110 generally comprises bolt 120, body 130, sleeve 150 and drive nut 180. Bolt 120 comprises head 122 with wrenching portion 123, male threaded portion 124, non-threaded portion 125 and break groove 126. Body 130 comprises head portion 132, bearing portion 133, and tapered ramp 136. Sleeve 150 comprises female threaded portion 155 in bore 153, bulbing portion 156 and base portion 158. Drive nut 180 comprises wrenching surfaces 182 and protrusions 184 that extend into recesses in body 130 that are not illustrated but may be similar to recesses 38. Head 122 restrains drive nut 180 in position above body 130 with protrusions 184 in the matching recesses.

Sleeve 150, body 130 and drive nut 180 are rotationally constrained together. Drive nut 180 and body 130 are rotationally constrained by protrusions 184 and mating recesses in body 30. Body 30 and sleeve 50 may be rotationally constrained together using various methods known in the art including using knurled or other fractioned enhancers and/or mechanical interlocks therebetween to reduce relative rotation between body 130 and sleeve 150. By way of example, this could include longitudinal knurls on ramp 136.

Installation of bolt 110 is accomplished by inserting bolt 110 through the desired aperture, restraining sleeve 50 by holding wrenching surfaces 182 and then rotating bolt 120 with wrenching surfaces 123 to tighten bolt 120 with respect to sleeve 150, drawing sleeve 150 over body 30 until bulbing portion 156 deforms to form an enlarged blind side head that clamps against the work pieces. Once the work pieces are fully clamped, break groove 126 fractures, permitting the removal of head 122 and drive nut 180.

Figure 17:
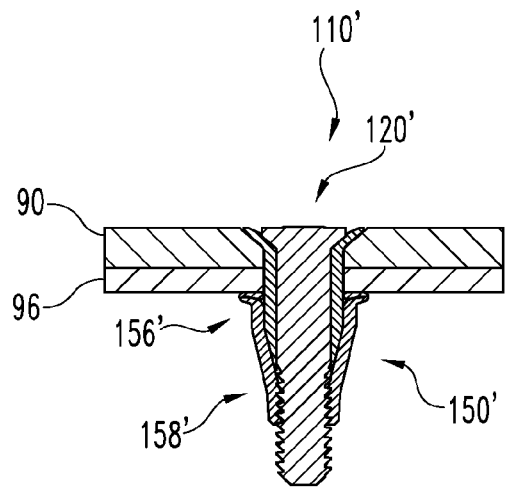
FIG. 17 is a cross-sectional view of blind fastener 110 installed through work pieces.

Referring now to FIG. 17, blind fastener 110' is illustrated which comprises a fully installed blind fastener 110 clamping pieces 90 and 96 together. Bulbing portion 156' has fully deformed to form blind side clamping surfaces and base portion 158' has deformed around sleeve 150. Break groove 126 is fractured leaving bolt 120' with a top edge that is substantially flush with the top surface of work piece 90.

Referring now to FIG. 18, yet another embodiment of a blind fastener is illustrated as blind fastener 210. Blind fastener 210 generally comprises core bolt 220, drive nut 280, body 230, sleeve 250 and nut 266. Bolt 220 comprises head 222, wrenching surfaces 223, male threaded portion 224 and break groove 226. Drive nut 280 comprises wrenching surfaces 282. Sleeve 250 comprises bore 253 and nut 266 comprises female threaded portion 268.

Drive nut 280, body 230, sleeve 250 and nut 266 are all rotationally constrained together as described above with regard to blind fastener 110. Sleeve 250 is similar to sleeve 150 but with a smooth bore with the threaded region being replaced with nut 266 on the end of bolt 220. A knurled interface between the sleeve and nut may be used to keep these two components rotationally restrained with respect to one another.

Figure 19:
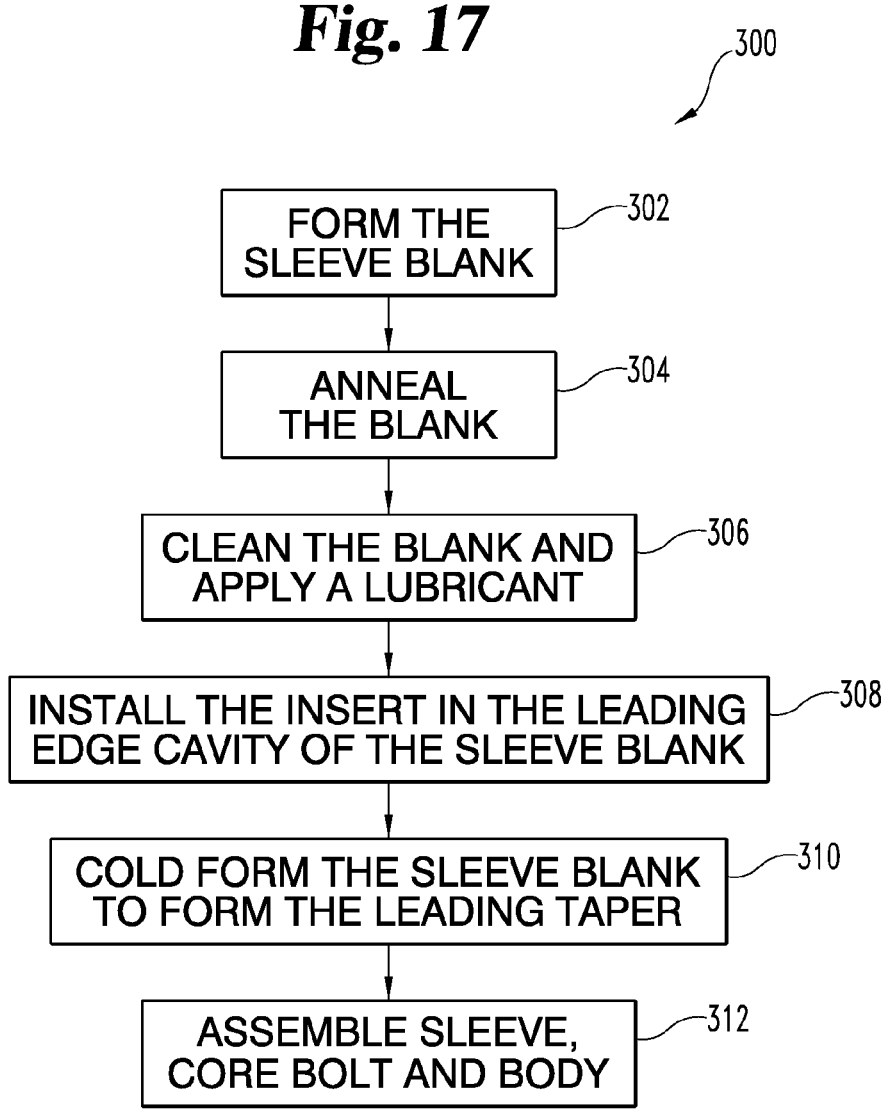
FIG. 19 is a flow diagram of a manufacturing method.

Referring now to FIG. 19, method 300 is illustrated which depicts one series of steps to manufacture sleeve 50. Method 300 begins with step 302 where a sleeve blank is formed. For example, sleeve 50.1 depicted in FIG. 13. Sleeve blank 50.1 can be made of AISI 304 stainless steel or A286 or commercially pure titanium as suitable depending on the final requirements and terms of tensile strength and weight restrictions. Sleeve blank 50.1 can be machined or progressively formed on a cold heading machine as desired.

Method 300 continues with step 304 where the sleeve blank is annealed particularly with 304SS or A-286, to remove any cold working effects from step 302. Step 304 is followed by step 306 where the sleeve blank is cleaned and a dry film lubricant is applied, for example, molybdenum-disulfide.

Method 300 continues with step 308 where insert 70 is installed in the leading edge cavity of sleeve 50.1 as illustrated in FIGS. 4 and 13. The insert should be inserted fully into the cavity so that point 76 aligns with narrowed portion 60.

Method 300 continues with step 310 where sleeve blank 50.1 is cold formed to generate leading taper 62 as described above. Step 310 can be accomplished by pressing sleeve 50.1 through a sizing guide or alternatively sleeve 51 can be crimped in a collet or any other method can be used as appropriate.

Method 310 concludes with step 312 where sleeve 50, bolt 20 and body 30 are assembled as illustrated in FIGS. 1 and 2.

FIGS. 4 and 13 reference several dimensions of the closed blind fastener. Many of these dimensions are scalable based on the diameter of the blind fastener and different size fasteners would have different performing blind side heads. In any event, the listed dimensions and how they would scale are as follows. The following dimensions are for a representative of a 3/16" (0.198 nominal OD) fastener. The body of such a fastener would have a nominal outer diameter of 0.198" and would fit in a hole or aperture between 0.199" and 0.202" in diameter.

Length 50L is approximately 0.468". This dimension is not scalable as it includes additional length to provide an acceptable grip range for a particular fastener, for example, 0.050". The grip range may or may not scale with different size fasteners so the overall length of sleeve 50 is not directly dependent upon the diameter of blind fastener 10.

Diameter 50D equals 0.196 (0.002" smaller than the nominal outer diameter of the body) and this is the dimension that many of the following sleeve parameters can be scaled from for a different size fastener. Thickness 54T is approximately 0.028 which is approximately 14% of 50D. Diameter 53D is approximately 0.140 which is approximately 71% of 50D. Diameter 60D is approximately 0.168 which is approximately 85% of 50D. Thickness 60T is approximately 0.015 which is approximately 8% of 50D. Diameter 61D is approximately 0.224 which is approximately 113% of 50D. Radius 61R is approximately 0.195 which is approximately 98% of 50D. Length 62L is approximately 0.085 which is approximately 43% of 50D. Length 64L is approximately 0.070 which is approximately 36% of 50D. Length 71L is approximately 0.050 which is approximately 25% of 50D. Diameter 73D is approximately 0.143 which is approximately 71% of 50D. Angle 62A is approximately 18 degrees plus or minus 5 degrees. As discussed above, this is but an approximation as leading taper 62 may have a slight parabolic shape. Angle 64A in one embodiment is also approximately 18 degrees plus or minus 5 degrees. In another embodiment, angle 64A is between approximately 21 and 25 degrees. In yet other embodiments, angle 64A may vary between 10 and 30 degrees. Angles 72A and 74A are both approximately 9 degrees (18 degrees if measured as a cone) although this can vary as appropriate with variations to angles 62A and 64A.

The fastener described above has an expanded blind side head with an approximate outer diameter of at least 0.350" up to 0.365" for a 0.316" fastener. The blind side head generally extends from the shank of body 30 out to this outer diameter, providing a grip surface area for ³⁄₁₆" fastener of approximately 0.26 square inches.

Regarding wrenching portions 23, 123 and 223 on bolts 20, 120 and 220, the illustrated embodiments utilize external flats that could be engaged by a wrench or socket type tool, as known in the art. In other embodiments (not illustrated), the illustrated wrenching portions 23, 123 and 223 could be replaced with an internal hex-shaped recess such as an Allen® recess. Other embodiments (not illustrated) may incorporate other types of internal wrenching surfaces recess known in the art including: Pozidriv®, Torx®, Spline Drive, Double Hex or Triple Square recesses, to name a few non-limiting examples of internally recessed wrenching surfaces.

Embodiments utilizing internal recess could omit break grooves 26, 126 and 226 and instead control installation torque by other means such as use of a torque wrench or a torque limited installation tool.

In any event, "wrenching portions" and "wrenching surfaces," as used herein, are intended to accommodate any known surface that can be used to engage a manual or automatic tool, including a cylindrical surface engageable by a one-way clutch or roller clutch. The blind fasteners disclosed herein can be used in both manual and automated applications. Use of cylindrical surfaces instead of wrenching flats makes it easier to use blind fasteners with automated installation robots. Conversely, in manual applications, human operators are adapt at adjusting parts as required to fit geometric wrenches, and geometric wrench apparatus are generally less expensive than one-way clutches. So other applications lend themselves to the use of conventional wrenching surfaces.

Regarding break grooves 26, 126 and 226, the geometrical configuration of the grooves or weakened regions can be varied to control the fracture characteristics of the various break grooves. If the tip of the break groove is sufficiently sharp, it acts as a stress concentration that may lead to a "brittle" type fracture. Conversely, if the tip of the break groove is sufficiently radiused or lengthened, then the amount of plastic deformation that occurs prior to fracture may increase, shifting the fracture to a ductile type tear. In any event, desirable performance characteristics for the break grooves can be found by balancing considerations such as bolt material and groove geometry.

As used herein, "above," "top," "second end" and "front side" refer to the head side of the blind fastener that includes the head portions of the bolt and body that is illustrated as located on the front side of the work pieces. Similarly, "bottom," "below," "first end" and "back side" refer to the side of the blind fastener that passes through the work pieces and may include the portions of the bolt, body and the sleeve that are located on the blind side of the work pieces.

The figures and illustrations included herewith are drawn to scale and represent a ³⁄₁₆" size blind fastener.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected.

I claim:

1. A blind fastener with an initial configuration and a deformed configuration when installed, the initial configuration comprising:
    a body comprising a tapered ramp portion and said body defining a body bore;
    a sleeve comprising a sleeve bore, a leading edge portion, a base portion and a bulbing portion therebetween, wherein an inner diameter of said bulbing portion gradually increases as said bulbing portion extends away from said leading edge portion to a narrowed portion and then gradually decreases as said bulbing portion extends from said narrowed portion toward said base portion, and wherein said leading edge portion abuts said tapered ramp;
    a core bolt passing through said body bore and said sleeve bore;
    a deformable insert positioned between said core bolt and said narrowed portion; and
    a means for advancing said sleeve over said body;
    wherein said sleeve buckles radially outwardly at said narrowed portion and doubles on itself when said leading edge portion is obstructed from advancing along said body and said means continues to advance said sleeve over said body.

2. The blind fastener of claim 1, wherein, in the initial configuration, the inner diameter of said bulbing portion increases in a first conical taper away from said leading edge portion to said narrowed portion.

3. The blind fastener of claim 2, wherein, in the initial configuration, the inner diameter of said bulbing portion decreases in a second conical taper from said narrowed portion toward said base portion.

4. The blind fastener of claim 3, wherein the angle of said second conical taper is between approximately 21 and 25 degrees.

5. The blind fastener of claim 3, wherein the angle of said second conical taper is between approximately 10 and 35 degrees.

6. The blind fastener of claim 1, wherein said leading edge portion further comprises a substantially rounded edge.

7. The blind fastener of claim 1, wherein said sleeve is made from a metal selected from the group comprising: AISI 300-series stainless steel, A-286 and commercially-pure titanium.

8. The blind fastener of claim 1, wherein, in the initial configuration, said deformable insert is trapped within the sleeve between said leading edge portion and said base portion.

9. The blind fastener of claim 1, wherein said leading edge portion is substantially thicker than said narrowed portion.

10. The blind fastener of claim 1, wherein said narrowed portion is approximately half as thick as said leading edge portion.

11. The blind fastener of claim 1, wherein, in the initial configuration, the axial length between the narrowed portion and the start of the base portion is at least half the axial length between the leading edge portion and the narrowed portion.

12. The blind fastener of claim 1, wherein, in the initial configuration, the axial length between the narrowed portion and the start of the base portion is between approximately 75 and 90 percent of the axial length between the leading edge portion and the narrowed portion.

13. The blind fastener of claim 1, wherein, in the initial configuration, the axial length between the narrowed portion and the start of the base portion is approximately 82 percent of the axial length between the leading edge portion and the narrowed portion.

14. A blind fastener with an initial configuration and a deformed configuration when installed, the initial configuration comprising:
a body comprising a ramp portion and the body defining a body bore;
a sleeve comprising a sleeve bore, a leading edge portion at a first side, a base portion at a second side, a bulbing portion and a narrowed thickness portion in the bulbing portion, wherein an inner diameter of the bulbing portion gradually increases as the bore extends away from the first side toward the narrowed thickness portion and the inner diameter of the bulbing portion gradually decreases as the bore extends toward the second side from the narrowed portion;
a central member passing through the body bore and the sleeve bore; and
a deformable insert positioned between the central member and the narrowed portion;
wherein the sleeve buckles radially outwardly at the narrowed portion and doubles over on itself when the sleeve is compressed between the leading edge portion and the base portion.

15. The blind fastener of claim 14, wherein, in the initial configuration, the inner diameter of the bulbing portion increases in a first conical taper as the bulbing portion extends away from the first end to the narrowed portion.

16. The blind fastener of claim 15, wherein, in the initial configuration, the inner diameter of the bulbing portion decreases in a second conical taper as the bulbing portion extends from the narrowed portion toward the second side.

17. The blind fastener of claim 14, wherein the base portion is generally cylindrical in shape with a generally uniform inner diameter.

18. The blind fastener of claim 14, wherein the base portion further comprises an internally threaded portion that is threadingly engaged with an externally threaded portion on the central member, wherein the threaded engagement between the base portion and the central member facilitates advancing the sleeve over the body by rotating the central member with respect to the sleeve.

19. A blind fastener comprising:
a body comprising a ramp portion and the body defining a body bore;
a sleeve comprising a sleeve bore, a leading edge portion at a first side, a base portion at a second side, a bulbing portion and a narrowed thickness portion in the bulbing portion, wherein an inner diameter of the bulbing portion gradually increases as the bore extends away from the first side toward the narrowed thickness portion and the inner diameter of the bulbing portion gradually decreases as the bore extends toward the second side from the narrowed portion;
a central member passing through the body bore and the sleeve bore; and
a deformable insert positioned between the central member and the narrowed portion;
wherein the sleeve buckles radially outwardly at the narrowed portion and doubles over on itself when the sleeve is compressed between the leading edge portion and the base portion and wherein the leading edge portion further comprises a substantially rounded edge.

20. A blind fastener comprising:
a body comprising a ramp portion and the body defining a body bore;
a sleeve comprising a sleeve bore, a leading edge portion at a first side, a base portion at a second side, a bulbing portion and a narrowed thickness portion in the bulbing portion, wherein an inner diameter of the bulbing portion gradually increases as the bore extends away from the first side toward the narrowed thickness portion and the inner diameter of the bulbing portion gradually decreases as the bore extends toward the second side from the narrowed portion;
a central member passing through the body bore and the sleeve bore; and
a deformable insert positioned between the central member and the narrowed portion;
wherein the sleeve buckles radially outwardly at the narrowed portion and doubles over on itself when the sleeve is compressed between the leading edge portion and the base portion and wherein the leading edge portion is substantially thicker than the narrowed portion.

21. A blind fastener comprising:
a body comprising a ramp portion and the body defining a body bore;
a sleeve comprising a sleeve bore, a leading edge portion at a first side, a base portion at a second side, a bulbing portion and a narrowed thickness portion in the bulbing portion, wherein an inner diameter of the bulbing portion gradually increases as the bore extends away from the first side toward the narrowed thickness portion and the inner diameter of the bulbing portion gradually decreases as the bore extends toward the second side from the narrowed portion;
a central member passing through the body bore and the sleeve bore; and
a deformable insert positioned between the central member and the narrowed portion;
wherein the sleeve buckles radially outwardly at the narrowed portion and doubles over on itself when the sleeve is compressed between the leading edge portion and the base portion.

* * * * *